(12) United States Patent
Koyama

(10) Patent No.: US 6,531,988 B1
(45) Date of Patent: Mar. 11, 2003

(54) ANTENNA DEVICE FOR HIGH-FREQUENCY RADIO APPARATUS, HIGH-FREQUENCY RADIO APPARATUS, AND WATCH-SHAPED RADIO APPARATUS

(75) Inventor: Shunsuke Koyama, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/856,848

(22) PCT Filed: Sep. 28, 2000

(86) PCT No.: PCT/JP00/06731

§ 371 (c)(1),
(2), (4) Date: May 24, 2001

(87) PCT Pub. No.: WO01/24309

PCT Pub. Date: May 4, 2001

(30) Foreign Application Priority Data

Sep. 28, 1999 (JP) ............................................. 11-274866
Mar. 30, 2000 (JP) ........................................ 2000-095421

(51) Int. Cl.[7] .............................. H01Q 1/12; H01Q 1/38
(52) U.S. Cl. .............................. 343/718; 343/700 MS; 343/702
(58) Field of Search ................................. 343/702, 845, 343/846, 848, 743, 700 MS, 718; H01Q 1/12, 1/38, 1/24

(56) References Cited

U.S. PATENT DOCUMENTS

| 5,007,105 A | * | 4/1991 | Kudoh et al. ................ 455/344 |
| 5,148,181 A | * | 9/1992 | Yokoyama et al. .......... 343/702 |
| 5,280,646 A | * | 1/1994 | Koyama et al. ............. 455/300 |
| 5,453,752 A | * | 9/1995 | Wang et al. ......... 343/700 MS |
| 5,585,807 A | * | 12/1996 | Takei .......................... 343/702 |
| 5,650,945 A | * | 7/1997 | Kita ............................. 364/569 |
| 5,734,350 A | * | 3/1998 | Deming et al. ...... 343/700 MS |
| 5,832,372 A | * | 11/1998 | Clelland et al. ............. 455/115 |
| 5,861,854 A | * | 1/1999 | Kawahata et al. .......... 343/702 |
| 5,886,669 A | * | 3/1999 | Kita ............................. 343/718 |
| 5,907,522 A | * | 5/1999 | Teodoridis et al. ........... 368/10 |
| 5,926,144 A | * | 7/1999 | Bolanos et al. ............. 343/718 |
| 5,966,097 A | * | 10/1999 | Fukasawa et al. ... 343/700 MS |
| 6,025,805 A | * | 2/2000 | Smith et al. ................. 343/702 |
| 6,130,650 A | * | 10/2000 | Curtis et al. ................ 343/846 |

FOREIGN PATENT DOCUMENTS

| EP | 0 0742 604 A2 | 11/1996 |
| JP | 3-175826 | 7/1991 |
| JP | 9-232855 | 9/1997 |
| JP | 9-326632 | 12/1997 |
| JP | 10-197662 | 7/1998 |

* cited by examiner

*Primary Examiner*—Don Wong
*Assistant Examiner*—Trinh Vo Dinh

(57) ABSTRACT

An antenna device for a high-frequency radio apparatus that enables the apparatus to be made compact and improves its sensitivity. The antenna has an L-shaped antenna element, the shorter part of which extends perpendicularly from a circuit substrate which has a ground pattern formed thereon. The area of the orthogonal projection of the longer part of the L-shaped antenna element, which is spaced apart from the circuit substrate and substantially parallel to its surface which has the ground pattern formed thereon, is smaller than the area of the ground pattern. The antenna also has a feeding line which is substantially parallel to the shorter part of the L-shaped antenna element. A dielectric member, which also functions to secure various components, is placed close to the antenna element so as to set the resonance frequency of the antenna device.

14 Claims, 14 Drawing Sheets

100A

ANTENNA DEVICE FOR HIGH-FREQUENCY RADIO APPARATUS, HIGH-FREQUENCY RADIO APPARATUS, AND WATCH-SHAPED RADIO APPARATUS

BACKGROUND OF THE INVENTION

The present invention relates to an antenna device used in high-frequency radio apparatuses and a compact-size high-frequency radio apparatus which uses the antenna device, and in particular, to a very compact-size high-frequency radio apparatus such as a watch-shaped high-frequency radio apparatus and an antenna device used in high-frequency radio apparatuses.

Conventionally, a helical dipole antenna is generally used as an antenna for portable devices such as cellular phones which belongs to high-frequency radio apparatuses.

The helical dipole antenna is configured in a manner that it is drawn out from or kept contained into the case of a portable device when used.

Furthermore, as disclosed in Japanese Patent Laid-Open Publication No.3-175826, there is also known another configuration in which another type of antenna is disposed within the case of a portable device so as to form a diversity together with a helical dipole antenna. As such an antenna for high-frequency radio apparatuses, which is incorporated within the case, an inverted-F antenna has been used.

A thin card type portable apparatus for 2.4[GHz] band employs a chip antenna using ceramic material.

However, the above-stated helical dipole is still large to apparatuses such as watch-size portable apparatuses which are demanded to be more compact. It is difficult to simply incorporate the helical dipole antenna into the apparatus case.

The degree of freedom for arrangement is low in the inverted-F antenna, since both its antenna element and its ground plate (main plate) are formed as an integral unit. As a result, the inverted-F antenna is difficult to be made compact any more.

On the other hand, in the case of the ceramic chip antenna, although the chip antenna itself can be surface-mounted, an antenna including its peripheral circuit is still large as a part. In addition, the chip antenna is fairly high in cost.

An object of the present invention is therefore to provide an antenna device for a high-frequency radio apparatus, a high-frequency radio apparatus, and a watch-shaped radio apparatus, which can be made more compact, increase sensitivity of the apparatus, and be prevented from being damaged by static electricity.

DISCLOSURE OF THE INVENTION

According to one aspect of the invention, an antenna device for a high-frequency radio apparatus is provided. The antenna device is connected to both a ground pattern and a feeding point formed on a circuit substrate. The antenna device comprises a metal, L-shaped antenna element, one end of which is connected to the ground pattern; and a feeding line, one end of which is connected to the feeding point and the other end of which is connected to a selected position on the antenna element so as to give the antenna device a predetermined value of impedance.

In another aspect, an orthogonal projection of the antenna element onto the plane defined in part by the ground pattern is included within the area of the ground pattern.

In another aspect, the area of orthogonal projection of the antenna element onto the plane defined in part by the ground pattern is smaller than the area of the ground pattern.

In another aspect, the antenna element is shaped into a lead wire.

In another aspect, the antenna device further comprises a dielectric member provided in the vicinity of the antenna element so as to set a resonance frequency of the antenna device to a predetermined value.

In another aspect, the dielectric member also functions to secure a display device, a circuit substrate, and a battery of the high-frequency radio apparatus.

In another aspect, a length of the antenna element is one fourth of the wavelength of the frequency to be used.

According to another aspect of the invention, a high-frequency radio apparatus is provided which comprises an antenna device for the high-frequency radio apparatus. The antenna devices comprises a ground pattern; a feeding point; a metal, L-shaped antenna element, one end of which is connected to the ground pattern; and a feeding line, one end of which is connected to the feeding point and the other end of which is connected to a selected position on the antenna element so as to give the antenna device a predetermined value of impedance; wherein the antenna device is connected to both the ground pattern and the feeding point formed on a circuit substrate. The high-frequency radio apparatus further comprises a plurality of electrical circuits mounted on the circuit substrate; and a display device for displaying information, the display device being positioned one side of the circuit substrate; wherein the antenna device is positioned on the same side of the circuit substrate as the display device.

In another aspect, the high-frequency radio apparatus further comprises a case which comprises a case body containing the antenna device, the display device, and the circuit substrate; and a case back made of conductive material. the high-frequency radio apparatus further comprises a battery having a plurality of electrodes for supplying power to drive the high-frequency radio apparatus; wherein the case back is electrically connected to either a ground pattern of the circuit substrate or the electrode of the battery.

According to another aspect of the invention, an antenna device for a high-frequency radio apparatus is provided. The antenna device is connected to both a ground pattern and a feeding point defined by an area formed on at least one layer of a multi-layer circuit substrate. The antenna device comprises a metal, L-shaped antenna element, one end of which is connected to the ground pattern; and a feeding line, one end of which is connected to the feeding point and the other end of which is connected to a selected position on the antenna element so as to give the antenna device a predetermined value of impedance.

In another aspect, an orthogonal projection of the antenna element onto the plane defined in part by the ground pattern is included within the area of the ground pattern.

In another aspect, the area of orthogonal projection of the antenna element onto the plane defined in part by the ground pattern is smaller than the area of the ground pattern.

In another aspect, the antenna element is shaped into a lead wire.

In another aspect, the antenna device further comprises a dielectric member provided in the vicinity of the antenna element so as to set a resonance frequency of the antenna device to a predetermined value.

In another aspect, the dielectric member also functions to secure a display device, a circuit substrate, and a battery of the high-frequency radio apparatus.

In another aspect, a length of the antenna element is one fourth of the wavelength of the frequency to be used.

According to another aspect of the invention, a high-frequency radio apparatus is provided which comprises an antenna device for a high-frequency radio apparatus. The antenna devices comprises a ground pattern; a feeding point; a metal, L-shaped antenna element, one end of which is connected to the ground pattern; and a feeding line, one end of which is connected to the feeding point and the other end of which is connected to a selected position on the antenna element so as to give the antenna device a predetermined value of impedance; wherein the antenna device is connected to both the ground pattern and the feeding point defined by an area formed on at least one layer of a multi-layer circuit substrate. The high-frequency radio apparatus further comprises a plurality of electrical circuits mounted on the circuit substrate; and a display device for displaying information, the display device being positioned on one side of the circuit substrate; wherein the antenna device is positioned on the same side of the circuit substrate as the display device.

In another aspect, the high-frequency radio apparatus further comprises a case comprising a case body containing the antenna device, the display device; and the circuit substrate; and a case back, made of conductive material. The high-frequency radio apparatus further comprises a battery for supplying power to drive the high-frequency radio apparatus; wherein the case back is electrically connected to either the ground pattern of the circuit substrate or an electrode of the battery.

According to another aspect of the invention, an antenna device for a high-frequency radio apparatus is provided, which comprises a circuit substrate with a ground pattern and a feeding point; a metal, L-shaped antenna element, one end of which is connected to the ground pattern; and a feeding line, one end of which is connected to the feeding point and the other end of which is connected to the ground pattern; wherein the antenna device is connected to both the ground pattern and the feeding point.

In another aspect, the circuit substrate has a plurality of layers, the feeding point and the ground pattern are formed on at least one layer of the plurality of layers, and the ground pattern covers approximately the entire surface of the layer on which the ground pattern is formed.

In another aspect, the ground pattern comprises an electrode pattern formed on a surface of the circuit substrate.

In another aspect, the ground pattern is formed over approximately the entire surface of the circuit substrate and is positioned under the antenna element.

In another aspect, a length of the antenna element is one fourth of the wavelength of the frequency to be used.

According to another aspect of the invention, a high-frequency radio apparatus is provided which comprises a wristwatch-shaped case; and an antenna device for a high-frequency radio apparatus. The antenna devices comprises a circuit substrate with a ground pattern and a feeding point; a metal, L-shaped antenna element, one end of which is connected to the ground pattern; and a feeding line, one end of which is connected to the feeding point and the other end of which is connected to the ground pattern; wherein the antenna device for the high-frequency radio apparatus is positioned within the wristwatch-shaped case, the antenna device being connected to both the ground pattern and the feeding point.

In another aspect, the circuit substrate has a plurality of layers, the feeding point and the ground pattern are formed on at least one layer of the plurality of layers, and the ground pattern covers approximately the entire surface of the layer on which the ground pattern is formed.

According to another aspect of the invention, an antenna device for a high-frequency radio apparatus is provided which comprises a circuit substrate having a ground pattern and a feeding point; a metal, L-shaped antenna element, one end of which is electrically connected to the ground pattern; and a feeding line, one end of which is connected to the ground pattern and the other end of which is connected to the feeding point, the feeding line extending from the circuit substrate.

In another aspect, the antenna element is made of a metal material and connected to the ground pattern via a conductive member made of the same material as the antenna element, the antenna element and the conductive member being integrally formed into an L-shape.

According to another aspect of the invention, a watch-shaped radio apparatus is provided which comprises a case and an antenna device for a high-frequency radio apparatus. The antenna device comprises a circuit substrate having a ground pattern positioned within the case; an antenna element, one end of which is electrically connected to the ground pattern, the antenna element extending from the circuit substrate and being in contact with an upper surface of the case; and a feeding line, one end of which is connected to the ground pattern and the other end of which is connected to a feeding point, the feeding line extending from the circuit substrate. The watch-shaped radio apparatus further comprises a radio circuit formed on the circuit substrate, the radio circuit being connected to the antenna device, wherein the case has a shape of a wristwatch and contains both the antenna device and the circuit substrate.

PREFERRED EMBODIMENTS OF THE INVENTION

With reference to the accompanying drawings, preferred embodiments of the present invention will now be described.

[1] First Embodiment

Figure 1:
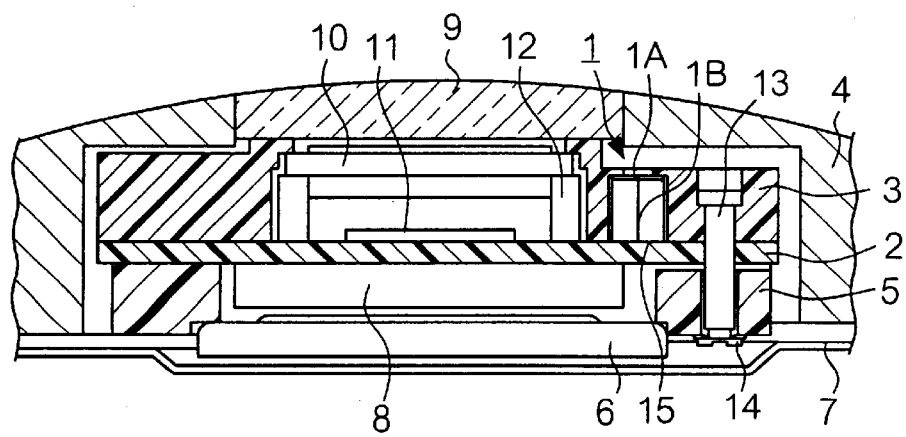
FIG. 1 shows a schematic sectional view of a watch-shaped radio apparatus according to a first embodiment.

FIG. 1 is a schematic sectional view of a watch-shaped radio apparatus according to a first embodiment of the present invention.

In FIG. 1, there is provided an inverted-F antenna 1, which is formed three-dimensionally and incorporated in a watch-shaped radio apparatus 100 as an antenna device for a high-frequency radio apparatus.

The inverted-F antenna 1 comprises an antenna element 1A and a feeding line 1B.

The antenna element 1A is made of metal and formed into an L-shape in section. The antenna element 1A is fixedly connected to a ground pattern (earth pattern) mounted on a circuit substrate 2. Soldering is a normal way to connect the antenna element 1A to the circuit substrate 2.

The feeding line 1B is conductibly secured at a given position on the antenna element 1A.

The circuit substrate 2 of the watch-shaped radio apparatus 100 is sandwiched from its upper and lower sides by plastic members 3 and 5.

In the plastic member 3, a micro nut 13 is inserted and formed in advance. The circuit substrate 2 is secured by applying a micro screw 14 to the micro nut 13 through the plastic member 5 from under the plastic member 3.

Securing the plastic member 3 to the circuit substrate 2 allows a conductive rubber 12 to be pressed onto the circuit substrate 2. By means of this conductive rubber 12, an LCD (Liquid Crystal Display) panel 10 is electrically connected to an LCD-driving pattern mounted on the circuit substrate 2.

An electric circuit 8 is mounted on the lower surface of the circuit substrate 2 and includes a radio circuit consisting of electric parts.

In FIG. 1, the electric circuit 8 is illustrated as a rectangular module for the sake of simplifying the drawing. Instead of such a module, the parts of the electric circuit 8 can be mounted directly on the substrate 2.

A button type battery 6 is used as a power source of the watch-shaped radio apparatus. The button type battery 6, which is secured on the member 5, is electrically connected to a case back 7 via a conductive plate which is not shown.

A cover glass 9 is fixedly arranged on a watchcase 4. The display of the LCD 10 can therefore be seen through the cover glass 9. The watchcase 4 and the case back 7 are secured by, usually, screwing.

Figure 2:
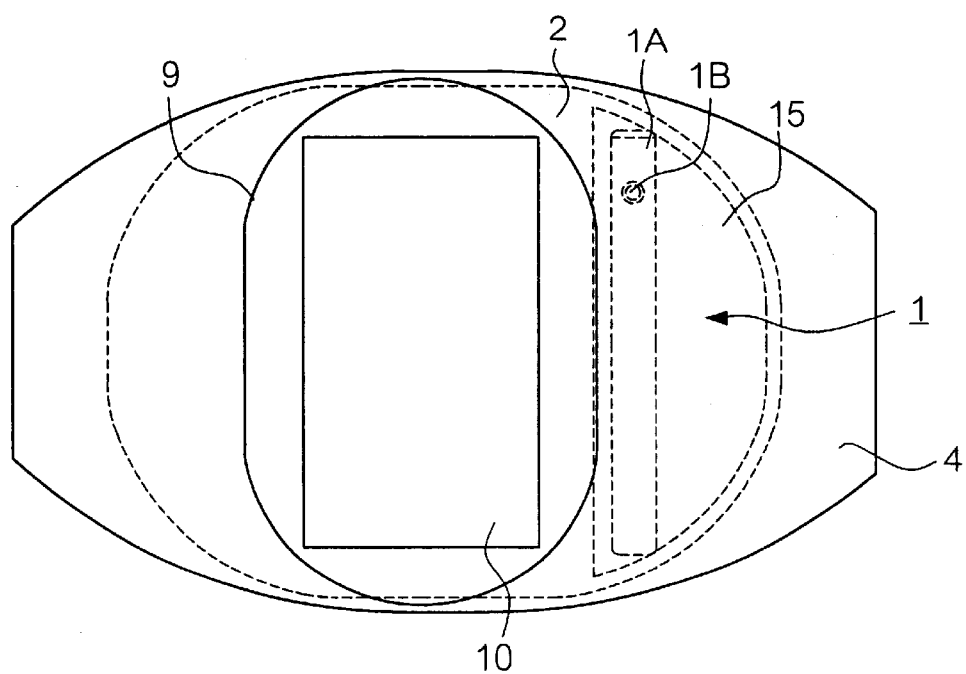
FIG. 2 shows a schematic perspective view of the top of the watch-shaped radio apparatus according to the first embodiment.

FIG. 2 shows a schematic perspective view of the top of the watch-shaped radio apparatus 100.

As shown in FIG. 2, a ground pattern 15 is formed on the circuit substrate 2.

Since it is often the case that the watchcase itself has a curved-line shape by virtue of design, the circuit substrate 2 is not necessarily a rectangular. However in many cases, it may be formed into a curved outer shape or folded-line outer shape. Accordingly, arranging parts and an electrode pattern such as the ground pattern 15 on the circuit substrate 2 in agreement with the shape of the circuit substrate 2 leads to effective utilization of the substrate area for miniaturizing the apparatus.

Figure 3A:
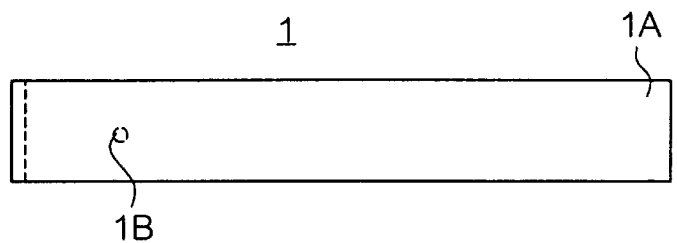
FIG. 3A is a plan view showing an inverted-F antenna of the first embodiment.
Figure 3B:
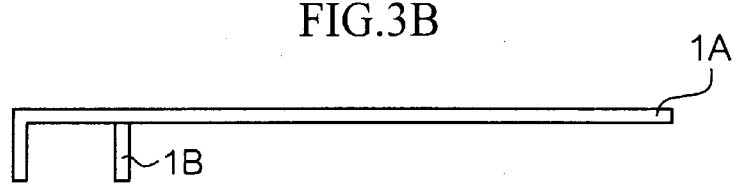
FIG. 3B is a front view showing the inverted-F antenna of the first embodiment.

FIG. 3A is a plan view of the inverted-F antenna 1 of the first embodiment, while FIG. 3B is a front view thereof.

The inverted-F antenna 1 comprises, as descried above, the plate antenna element 1A folded into an L-shape at one end and the feeding line 1B.

It is preferable that the antenna element 1A be made of materials, such as copper, whose conductivity is high. It is also possible to use high-conductivity materials as the surface plating.

The feeding line 1B is conductibly secured at a position on the inverted-F antenna 1A in a way that the inverted-F antenna 1A may have a predetermined value of impedance after its securing. The value of impedance is, for example, 50 [Ω]. The feeding line 1B is perpendicularly linked to the antenna element 1A.

In order to keep electric resistance to be low, it is preferred that antenna element 1A and feeding line 1B be connected to each other by brazing or soldering.

[2] Second Embodiment

Figure 4A:
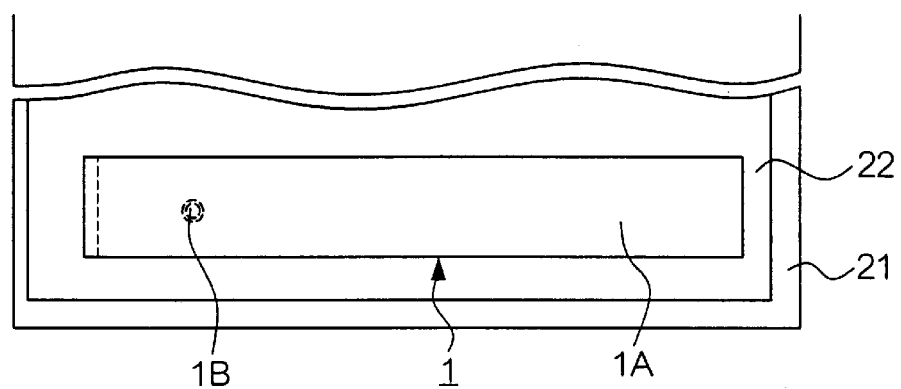
FIG. 4A is a plan view showing an inverted-F antenna of a second embodiment.
Figure 4B:
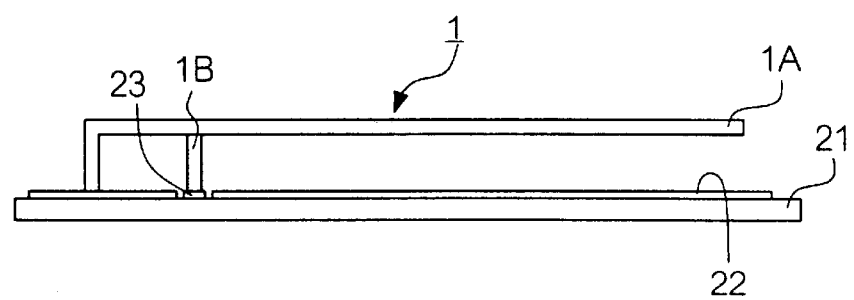
FIG. 4B is a front view showing the inverted-F antenna of the second embodiment.

FIGS. 4A and 4B show a second embodiment of the present invention. In these FIGS. 4A and 4B, the same or identical reference numerals as to those in FIGS. 1 to 3 are shown with the same reference numerals.

FIG. 4A is a plan view showing a mounted state of the inverted-F antenna 1 according to the second embodiment. FIG. 4B is, on the other hand, is a front view showing the mounted state of the inverted-F antenna 1 of the second embodiment.

On the upper surface of a circuit substrate 21, an electric conductor pattern (plane electrodes) 22 is arranged.

One end of the antenna element 1A is conductibly secured to the conductor pattern 22.

The feeding line 1B is conductibly connected to a feeding terminal pattern 23 mounted on the circuit substrate 21. In this configuration, it is also possible to use a hole pattern as the feeding terminal pattern 23, which is a through hole formed through the circuit substrate 21, and solder the feeding line 23, after inserted into the hole pattern.

Further, the feeding terminal pattern 23 is linked to the ground (earth) potential in DC (direct current) to a signal supplied from the inverted-F antenna 1.

For the sake of easier understanding, FIGS. 4A and 4B does not show circuit parts and other structural components structured on the circuit substrate 21, but only show the antenna part.

The length of the antenna element 1A, which composes the inverted-F antenna 1, is approximately a quarter of a wavelength of a frequency to be used, including its folded portion; for example, approximately 3 [cm] at a frequency of 2.5 [GHz].

The feeding line 1B is connected to a position on the antenna element 1A so that the position corresponds to a predetermined value of impedance (for example, 50 [Ω]) to the ground potential in the vicinity of the feeding terminal pattern 23.

Impedance values of circuit terminals and wiring are determined so that the impedance of signal lines connecting with the feeding terminal pattern 23 from a not-shown circuit is also set to an identical value (for example, 50 [Ω]).

Specifically, concerning signal lines connected to the feeding terminal pattern 23, it is preferable, in matching the inverted-F antenna 1 with the signal lines, that the signal lines be formed by strip lines, with a given value of impedance, arranged on the back (not shown) of the circuit substrate 21.

Theoretically, it is best that the inverted-F antenna 1 be arranged at the center of the ground pattern of the circuit substrate 21. However, it is usually difficult to arrange the antenna at the center of the circuit substrate 21, due to the arrangement of the other parts, for miniaturizing the total size of the apparatus.

Therefore, it is enough to provide a configuration that the orthogonal projection of the antenna element 1A, whose projected plane is on the ground pattern, is included in the ground pattern.

Alternatively, it is enough to provide a configuration that the orthogonal projection of the antenna element 1A, whose projected plane is on the ground pattern, is smaller in area than the ground pattern.

Practical examples of such configurations will now be described, in which the orthogonal projection of the antenna element 1A, whose projected plane is on the ground pattern, is included in the ground pattern, or, the orthogonal projection of the antenna element 1A, whose projected plane is on the ground pattern, is smaller in area than the ground pattern.

Figure 5:
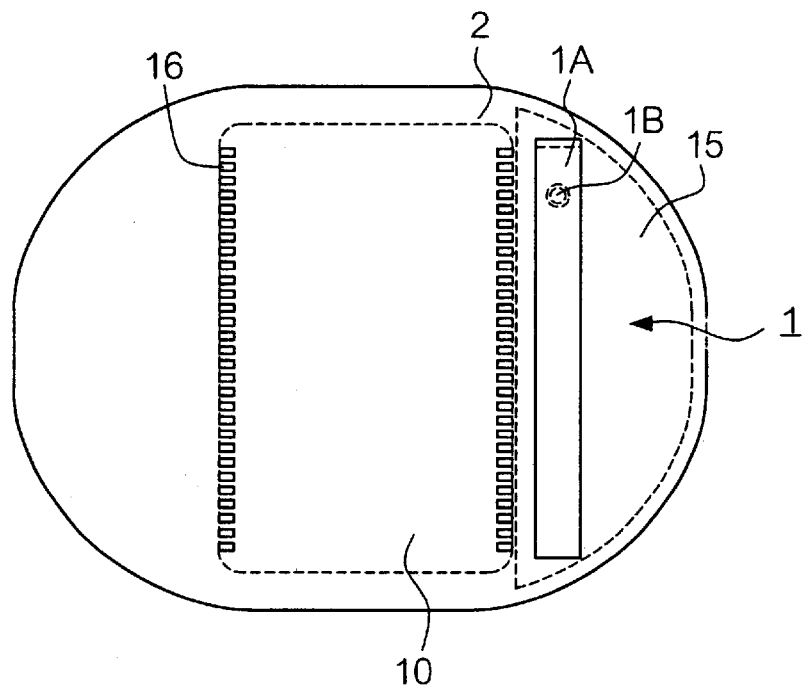
FIG. 5 illustrates a mounted state of the inverted-F antenna.

FIG. 5 illustrates a mounted state of the inverted-F antenna.

On the upper surface of the circuit substrate 2, a ground pattern 15 is mounted at a position facing the antenna element 1A.

In addition, on the upper surface of the circuit substrate 2, drive signal electrode patterns 16 are mounted for drive signals to drive the LCD 10.

Wiring to the LCD 10 of a compact apparatus having an LCD panel is usually realized by connecting drive signal electrodes embedded in the LCD 10 itself and the drive signal electrode patterns 16 mounted on the upper surface of the circuit substrate 21 via the conductive rubber 21 (refer to FIG. 1).

In general, the LCD 10 that functions as a user interface of the apparatus is arranged at the center thereof. In the case of such an arrangement, the drive signal electrode patterns 16 and a display driver for generating drive signals or a CPU including a display driver, which are not shown, are arranged on the back of the LCD 10. Thus, the area on the circuit substrate 2, which corresponds to the LCD 10, is occupied by wiring for connecting the drive signal electrode patterns 16 and the CPU.

In this case, a multilayer substrate may be used to arrange such a wiring section on another layer utilizing through holes.

However, this method still requires the same substrate area compared to a wiring configuration without a multilayer substrate. This means that utilizing a multilayer substrate does not contribute to the reduction of the area used on the substrate.

After all, this results in that the central part on the upper surface of the circuit substrate 2 is occupied by the drive signal electrode patterns 16 of the LCD 10. Thus, there arises a restriction that the inverted-F antenna 1 and the ground pattern 15 have to be arranged at either one end of the circuit substrate 2.

The ground pattern 15 shown in FIG. 5 is mounted in some shape, not necessarily rectangular, at one end of the upper surface of the circuit substrate 2.

In this case, the orthogonal projection of the antenna element 1A, whose projected plane is on the ground pattern, is included in the ground pattern 15. Alternatively, the orthogonal projection of the antenna element 1A, whose projected plane is on the ground pattern, is smaller in area than the ground pattern 15.

A practical example is that, when a frequency to be used is 2.5 [GHz], a length of the antenna element 1A is approximately 28 [mm] in its longitudinal direction and a height from the circuit substrate 2 is 2 [mm]. Under such conditions, the antenna device can be configured to have the antenna element 1A whose width is approximately 2 [mm].

When taking it account that the member composing the antenna element 1A has enough strength, a thickness of the antenna element 1A can be set to approximately 0.2 [mm].

Incidentally, it is possible that the width and thickness of the antenna element are determined to optimum values based on conditions, such as physical strength of material composing the antenna element 1A, spacing allowed on the circuit substrate 2, and a necessary antenna gain. When the antenna element 1A is made up of urethane-coated copper wire, there are advantages in size, workability, and manufacturing cost.

[3] Antenna Retaining Mechanism in First and Second Embodiments

A retaining mechanism of the antenna used in the first and second embodiments will now be described.

Figure 6:
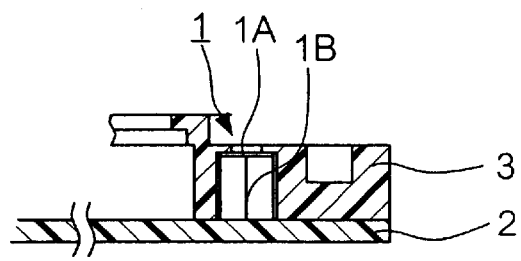
FIG. 6 is a cross sectional view showing the part of an antenna of the watch-shaped radio apparatus in order to exemplify a retaining mechanism.

FIG. 6 is a sectional view showing only the peripheral part of the antenna element 1A shown in FIG. 1.

The antenna element 1A positioned over the circuit substrate 2 is retained from the upper side thereof by the plastic member 3 (hatched part) which also functions as a securing frame for the LCD 10. This retainment prevents the antenna element 1A from moving upward from the circuit substrate 2.

An approximately parallel part of the antenna element 1A to the circuit substrate 2 is therefore kept parallel to the circuit substrate 2. The inverted-F antenna 1 thus constructed has minimal variation in a degree of parallel to the circuit substrate 2 when the antenna is mounted. As a result, variation in the characteristics of the inverted-F antenna 1 can be reduced.

Figure 7:
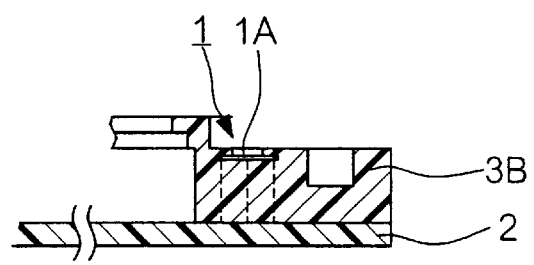
FIG. 7 is an illustration of another example of the retaining mechanism.

FIG. 7 illustrates another example of the retaining mechanism.

In this example, as shown in FIG. 7, the plastic member shown in FIG. 6 is replaced by a plastic member 3B which also loads plastic material beneath the antenna element. If taking the structure into consideration, part of the watchcase may be used as a plastic member having the above function.

Thus, the plastic member 3B retains the antenna element 1A from its upper and lower sides.

This structure prevents the antenna element 1A from being deformed from its upper and lower sides.

Accordingly, the deformation of the antenna can be suppressed further.

It is well known that the wavelength of a high-frequency signal is shortened by the impedance of the space through which the signal is transmitted.

When placing a dielectric member around the antenna, the wavelength of a frequency to be used is therefore shortened according to a dielectric constant of the dielectric member around the antenna.

Accordingly, when a section of the plastic member 3 or 3B, which is positioned closely to the upper (and/or lower) side of the antenna element 1A, is set to have an optimum area, the length of the element that resonates at a desired frequency in the air can adequately be adjusted to a shorter value.

In addition, changing materiel of the plastic member 3 or 3B into member having a higher dielectric constant will lead to antennas that are more compact.

The above retaining mechanism is able to provide compact antennas, without particular manufacturing process such as a ceramic chip antenna. In particular, by using a feature of a dielectric such as plastic which is usually used in the watch-shaped radio apparatus 100, the antenna can be made compact so as to have a practical size, without increasing manufacturing cost unnecessarily.

A plastic member is generally used as a securing member incorporated within apparatuses including digital watches and compact information devices. In this respect, however, the securing member is not limited to one made of plastic. Various kinds of members made of different dielectric members are usable for shortening the antenna. It is therefore preferable that the securing member be chosen with consideration of excellence in workability, incombustibility, cost, and others.

[4] Formation of Ground Pattern

How to form the ground pattern will now be described.

Figure 8:
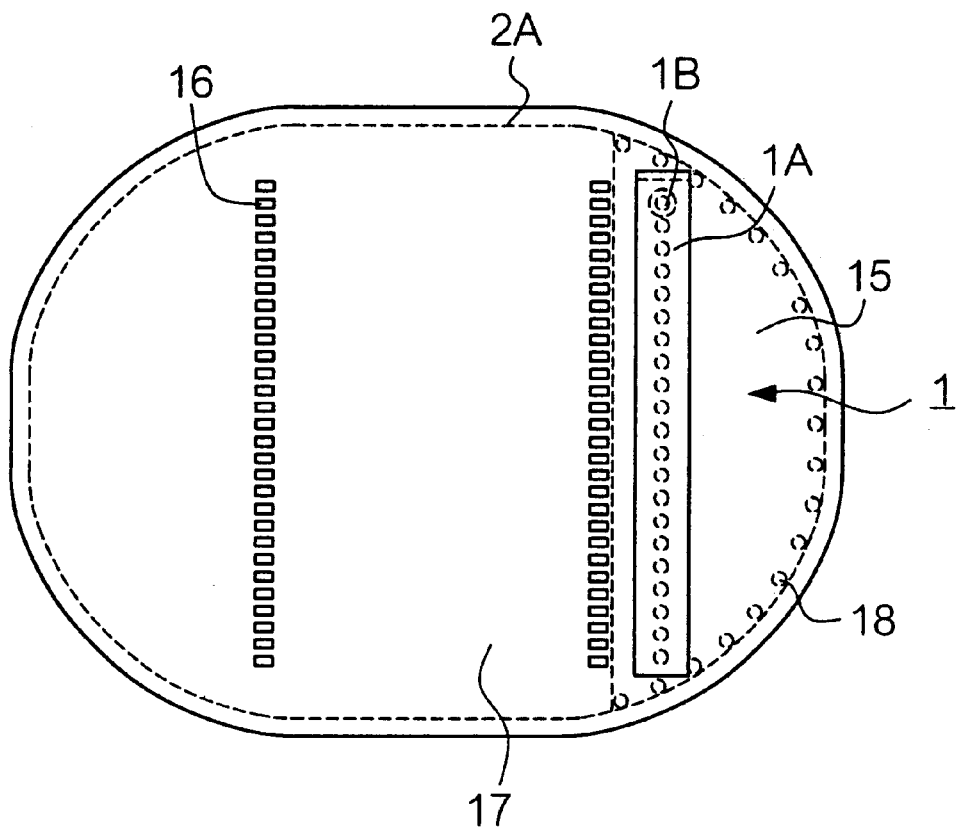
FIG. 8 is an illustration of an example for forming a ground pattern on a multilayer substrate.
Figure 9:
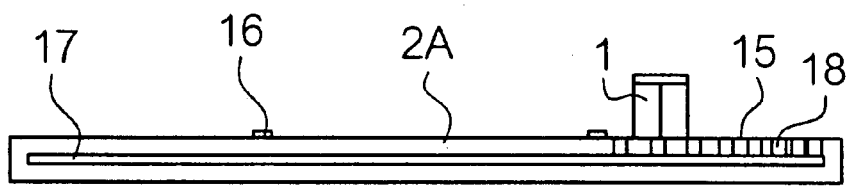
FIG. 9 shows a cross section of the multilayer substrate in FIG. 8.

FIG. 8 is an illustration showing an example of forming the ground pattern for a multilayer substrate. FIG. 9 is a sectional view of the multilayer substrate shown in FIG. 8.

In FIG. 8, a circuit substrate 2A is a multilayer substrate, in which, as shown in FIG. 9, circuit patterns can be mounted on inner layers as well as its surface.

More specifically, a ground pattern 17 is mounted over the almost entire surface of at least one of the inner layer substrates.

The ground pattern 17 is connected to the ground pattern 15 formed on the front surface of the circuit substrate 2A via a plurality of through holes 18.

The area of the ground pattern 15 is restricted by the drive signal electrode patterns 16 of the LCD 10, as described before. As shown in FIG. 8, the ground pattern 15 is therefore made larger in area than, at least, the orthogonal projection of the antenna element 1A to the ground pattern 15. In addition, a conductive connection with the ground pattern 17 on inner layers provides a larger ground pattern area. To obtain a sufficient ground pattern area to the antenna element 1A, it is therefore preferable that the area of the ground pattern 17 on inner layers spread over the almost entire surface on the inner layers. Alternatively, if there is a margin for an antenna gain owing to the system configuration of the watch-shaped radio apparatus 100, the inner substrates are partly used for other wiring patterns.

Figure 10:
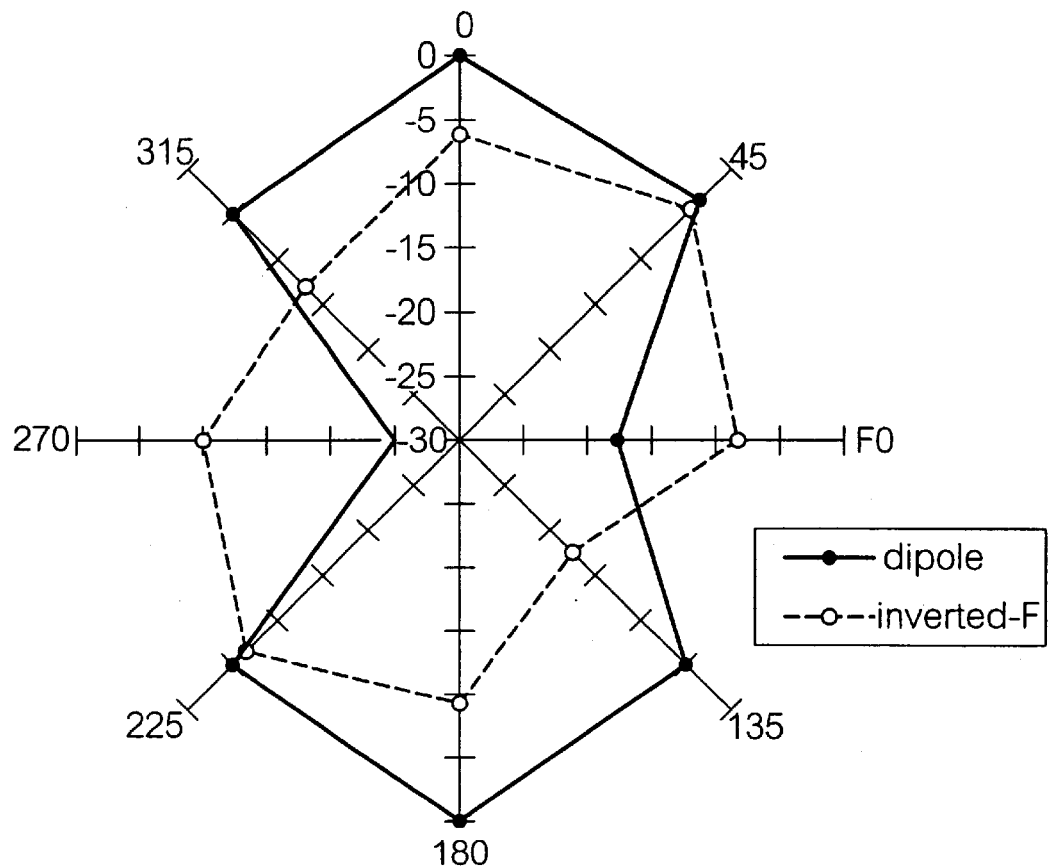
FIG. 10 illustrates an example of a characteristic of the inverted-F antenna.

FIG. 10 exemplifies a radiation pattern of the thus-constructed inverted-F antenna device.

The characteristic is changed correspondingly to the shape of a case when the watch-shaped radio apparatus 100 is practically produced. With this respect considered, FIG. 10 exemplifies a radiation pattern of only an inner circuit module excluding the case back 7 (refer to FIG. 1). This result reveals that a direction showing a maximum gain is different from that of a dipole antenna, because there is an influence from parts other than the antenna.

However, it is understood that the radiation pattern has no problem for practical uses.

[5] Wearing Watch-shaped Radio Apparatus

Wearing a wristwatch-shaped radio apparatus according to the embodiments of the present invention on the user's wrist will now be described.

In FIG. 1, the case back 7 made of metal such as stainless steel is positioned beneath the watch-shaped radio apparatus according to the embodiments of the present invention.

The case back 7 is conductibly connected to the positive electrode of the battery 6 by way of terminal plates or others. The negative electrode of the battery 6 is electrically connected to the ground pattern of the circuit substrate 2 by way of terminal plates or others. Similarly, the positive electrode of the button type battery 6 is also electrically connected to a power source on the circuit substrate 2 through terminal plates or others. A by-pass capacitor is normally electrically connected between a power source terminal and a ground terminal, thereby the circuit being stabilized by a reduced value of impedance of the power source. In the case of such high-frequency apparatuses, the patterns of the ground and power source are considered to have the same potential in AC (alternating current) to the earth potential.

By the way, in cases where the watch-shaped radio apparatus 100 configured as shown in FIG. 8 is worn on the user's wrist, the inverted-F antenna 1 is located on the upper side of the apparatus, which is spaced apart from the wrist. In contrast, the ground pattern 15 mounted on the upper surface of the circuit substrate 2A is positioned under the inverted-F antenna 1.

Further, a ground pattern 17 is positioned on inner layers of the circuit substrate 2A. Further, under the ground pattern formed on the inner layers, the battery 6 and also the case back 7, having a larger area, are positioned. As stated above, the metal-made case back 7 can be regarded as being the same in potential in AC as the ground pattern of the circuit substrate 2A. That is, the metal-made case back 7 has the effect to widen the ground area to the inverted-F antenna 1.

Moreover, this wearing results in that the user's body (arm) is connected to the ground potential of the antenna via the case back 7. The user's body itself can be considered the ground when the apparatus is worn by a user, thus providing a configuration in which the ground area is further widened to the antenna.

[6] Advantages of First and Second Embodiments

The foregoing first and second embodiments are able to provide the advantages as bellow.

(1) There can be provided a compact-size radio apparatus having an inverted-F antenna integrally formed with a circuit substrate.

(2) The size of the antenna element can be shortened than that required in the air by placing a dielectric member around the antenna, so that a compact radio apparatus can be provided.

(3) Additionally, as the dielectric member placed around the antenna, a securing member disposed in the apparatus can be used in common. Therefore, it is possible to provide radio apparatuses which are made compact by an efficient use of the inner space and which exhibit stabilized antenna characteristics of which variations being adjusted by the use of an antenna retaining mechanism.

(4) The antenna is arranged over the upper surface of the substrate, while the ground pattern, battery, and metal-made case back are arranged in turn from beneath the substrate. This results in that, when the apparatus is worn by a user, a portion positioned under the substrate, including the user's body, is given the ground potential. Therefore, a compact radio apparatus can be provided, which has a larger ground area to the antenna element when worn on the user's body.

(5) Making an antenna compact is prerequisite for miniaturization of a radio apparatus. It is considered that an operating frequency is raised to attain such a compact apparatus. However, the operating frequency has already been assigned to a given value by regulations and others, so no choice can be done freely.

Therefore, in order to make a smaller antenna under the predetermined regulations and to raise an antenna gain at the same time, the following points have to be taken into consideration.

The consideration should be given to the configuration of the antenna itself, how to form the ground, and a relationship with members positioned around the antenna.

Furthermore, in the case that the apparatus is designed to be worn by a user, a relationship with the human body must be taken into consideration so as to accomplish an optimum antenna operation.

As described above, the antenna is optimized with respect to a relationship with its constituents, and there can be provided a compact radio apparatus whose operating characteristics are stable even when a user wears the apparatus.

[7] Third Embodiment

The inverted-F antenna 1 in the first and second embodiments has been constructed three-dimensionally, in which the feeding line should be connected to the antenna perpendicularly.

This structure causes the distance between the antenna element and the substrate to be longer and the feeding line to be longer. It becomes therefore difficult to realize a given value of the strength of the antenna itself and to hold the antenna in parallel to the ground.

Additionally, when arranging the antenna outside the case, there is a possibility that the structure becomes complicated, because a connecting portion between the feeding line and the antenna should be placed outside the case as well.

This will raise a possibility that the static electricity reaches the radio circuit through the feeding line and the radio circuit is damaged, when the static electricity is attracted to the antenna in a case where the feeding line connects the antenna with the radio circuit.

Figure 11:
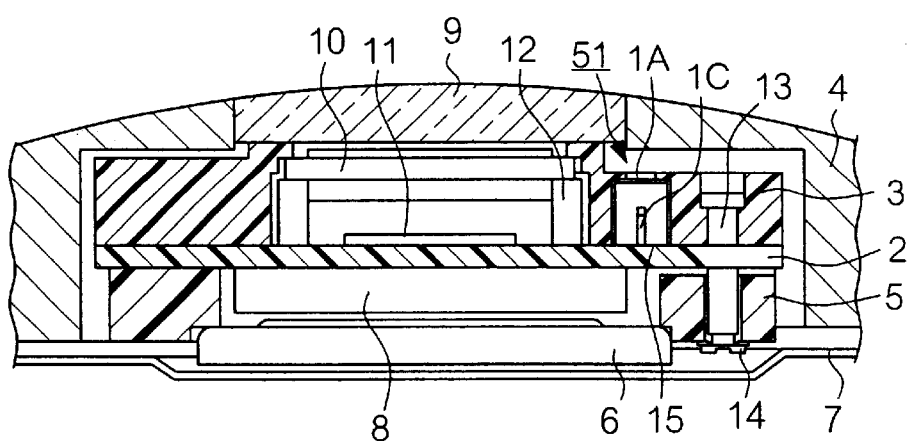
FIG. 11 shows a schematic sectional view of a watch-shaped radio apparatus according to a third embodiment.

Accordingly, in place of the feeding line 1B described in the first or second embodiment, a third embodiment adopts a feeding line 1C arranged in parallel with the antenna element 1A (refer to FIG. 11).

FIG. 11 is a schematic sectional view of a watch-shaped radio apparatus according to the third embodiment of the present invention. FIG. 11 has the same or identical reference numerals as to those in the first embodiment shown in FIG. 1, which are represented by the same reference numerals.

As shown in FIG. 11, an inverted-L antenna 51 is configured three-dimensionally as an antenna device for a high-frequency radio apparatus, which is incorporated in a watch-shaped radio apparatus 100A.

Figure 12:
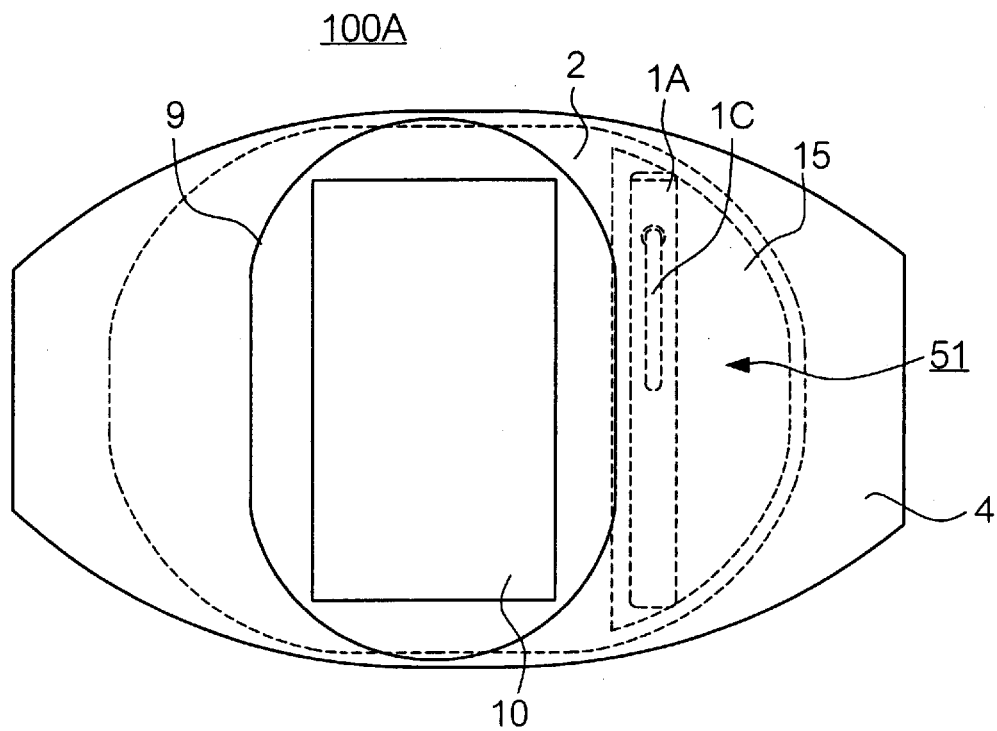
FIG. 12 shows a schematic perspective view from the top of the watch-shaped radio apparatus.

FIG. 12 shows a schematic perspective view of the top of the watch-shaped radio apparatus 100A.

As shown in FIG. 12, a ground pattern 15 is mounted on the circuit substrate 2.

Figure 13A:
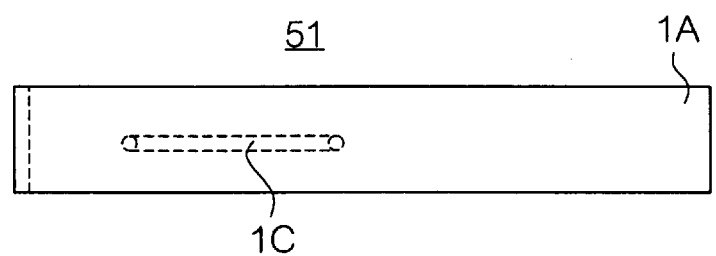
FIG. 13A is a plan view showing an inverted-L antenna of the third embodiment.
Figure 13B:
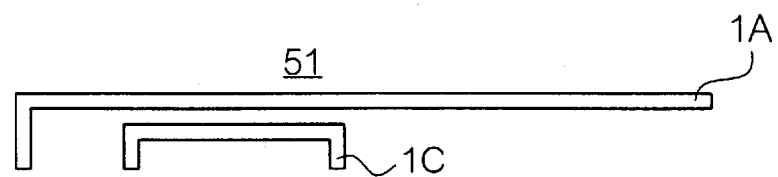
FIG. 13B is a front view showing the inverted-L antenna of the third embodiment.

FIG. 13A is a plan view of the inverted-L antenna 51 of the third embodiment, while the FIG. 13B is a front view thereof.

The inverted-L antenna 51 comprises, as stated above, a plate-like antenna element 1A whose one end is folded in the L-shape, and a feeding line 1C arranged so as to be in parallel with a longitudinal section of the antenna element 1A at a position spaced apart by a predetermined distance from the antenna element 1A.

The feeding line 1C is secured at a position that provides a given value of impedance of the inverted-L antenna 51 after being secured. The impedance value is 50 [Ω], for example.

[8] Fourth Embodiment

Figure 14A:
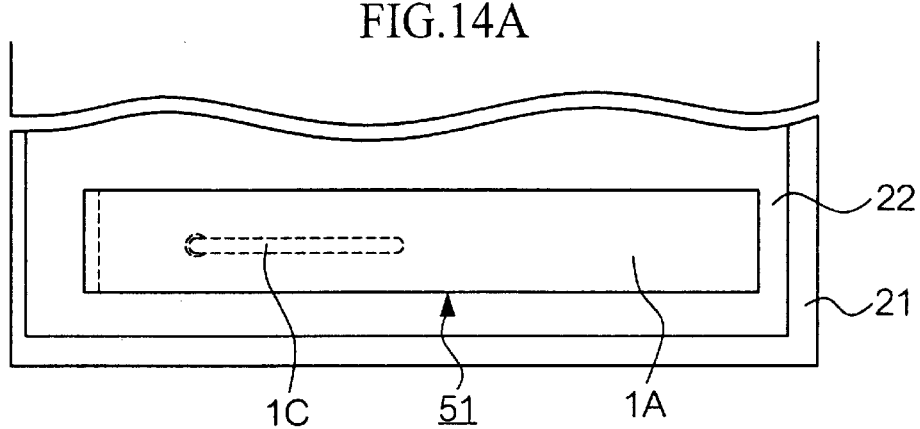
FIG. 14A is a plan view showing a mounted inverted-L antenna of a fourth embodiment.
Figure 14B:
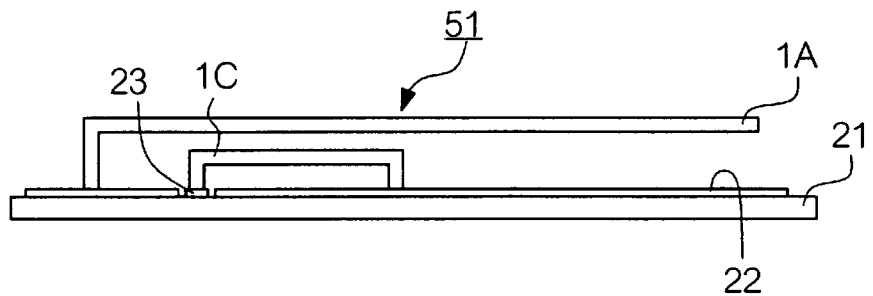
FIG. 14B is a front view showing the mounted inverted-L antenna of the fourth embodiment.

FIGS. 14A and 14B show a fourth embodiment of the present invention. In FIGS. 14A and 14B, the same or identical reference numerals as to those in FIGS. 11, 12, 13A or 13B are shown with the same reference numerals.

FIG. 14A is a plan view showing the mounted-state inverted-L antenna 51 according to the fourth embodiment. FIG. 14B is a front view showing the mounted-state inverted-L antenna 51 of the fourth embodiment.

On the upper surface of the circuit substrate 21, the electric conductor pattern (plane electrodes) 22 is mounted.

One end of the antenna element 1A is conductibly secured to the conductor pattern 22.

The feeding line 1C is conductibly connected to a feeding terminal pattern 23 mounted on the circuit substrate 21. In accomplishing this configuration, it is also possible to use a hole pattern as the feeding terminal pattern 23, which is a through hole formed through the circuit substrate 21, and solder the feeding line 1B after inserted into the hole pattern.

Further, the feeding terminal pattern 23 is linked to the ground (earth) potential in DC (direct current) to a signal supplied from the inverted-L antenna 51.

For the sake of easier understanding, FIGS. 14A and 14B do not show circuit parts and other structural components on the circuit substrate 21, but show only the antenna part.

The length of the antenna element 1A which composes the inverted-L antenna 51 is approximately a quarter of a wavelength of a frequency to be used, including its folded portion; for example, approximately 3 [cm] at a frequency of 2.5 [GHz].

The feeding line 1C is connected to a position on the antenna element 1A so that the position corresponds to a predetermined value of impedance (for example, 50 [Ω]) to the ground potential in the vicinity of the feeding terminal pattern 23.

Impedance values of circuit terminals and wiring are determined so that the impedance of signal lines connecting with the feeding terminal pattern 23 from a not-shown circuit is also set to an identical value (for example, 50 [Ω]).

Specifically, concerning signal lines connected to the feeding terminal pattern 23, it is preferable, in matching the inverted-L antenna 51 with the signal lines, that the signal lines be formed by strip lines, with a given value of impedance, arranged on the back (not shown) of the circuit substrate 21.

Theoretically, it is best that the inverted-L antenna 51 be arranged at the center of the ground pattern of the circuit substrate 21. However, it is usually difficult to arrange the antenna at the center of the circuit substrate 21, due to the arrangement of the other parts, for miniaturizing the total size of the apparatus.

Therefore, it is enough to provide a configuration that the orthogonal projection of the antenna element 1A, whose projected plane is on the ground pattern, is included in the ground pattern.

Alternatively, it is enough to provide a configuration that the orthogonal projection of the antenna element 1A, whose projected plane is on the ground pattern, is smaller in area than the ground pattern.

Practical examples of configurations will now be described, in which the orthogonal projection of the antenna element 1A, whose projected plane is on the ground pattern, is included in the ground pattern, or, the orthogonal projection of the antenna element 1A, whose projected plane is on the ground pattern, is smaller in area than the ground pattern.

Figure 15:
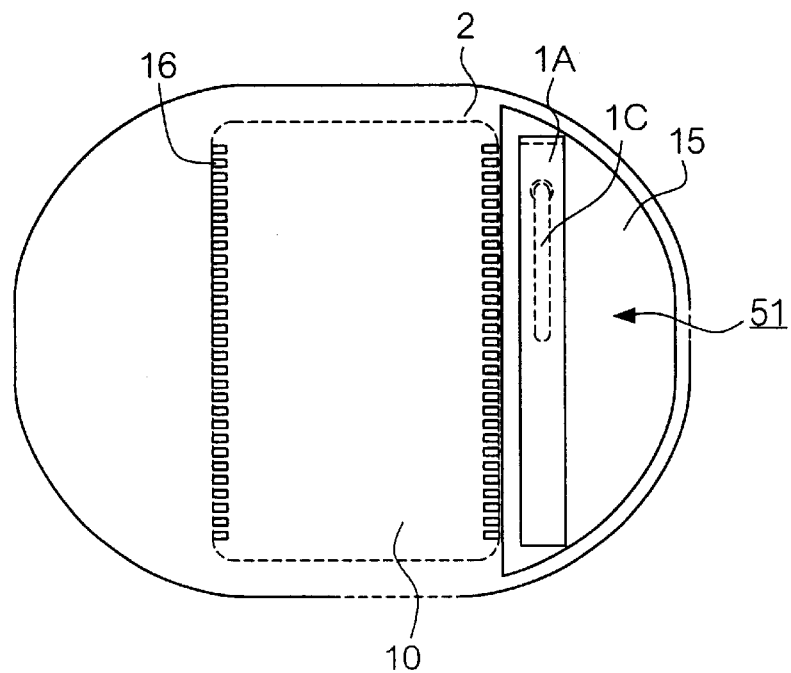
FIG. 15 illustrates a mounted state of the inverted-L antenna.

FIG. 15 illustrates a mounted state of the inverted-L antenna.

On the upper surface of the circuit substrate 2, a ground pattern 15 is mounted at a position facing the antenna element 1A.

In addition, on the upper surface of the circuit substrate 2, drive signal electrode patterns 16 is mounted for drive signals to drive the LCD 10.

Wiring to the LCD 10 of a compact apparatus having an LCD panel is usually realized by connecting drive signal electrodes embedded in the LCD 10 itself and the drive signal electrode patterns 16 mounted on the upper surface of the circuit substrate 2 via the conductive rubber 21 (refer to FIG. 1).

In general, the LCD 10 that functions as a user interface of the apparatus is arranged at the center thereof. In the case of such an arrangement, the drive signal electrode patterns 16 and a display driver for generating drive signals or a CPU including a display driver, which is not shown, are arranged on the back of the LCD 10. Thus, the area on the circuit substrate 2, which corresponds to the LCD 10, is occupied by wiring for connecting the drive signal electrode patterns 16 and the CPU.

The ground pattern 15 as shown in FIG. 15 is mounted in a shape, not necessarily rectangular, at one end of the upper surface of the circuit substrate 2.

In this case, the orthogonal projection of the antenna element 1A, whose projected plane is on the ground pattern, is included in the ground pattern 15. Alternatively, the orthogonal projection of the antenna element 1A, whose projected plane is on the ground pattern, is smaller in area than the ground pattern 15.

[9] Fifth Embodiment

Figure 16A:
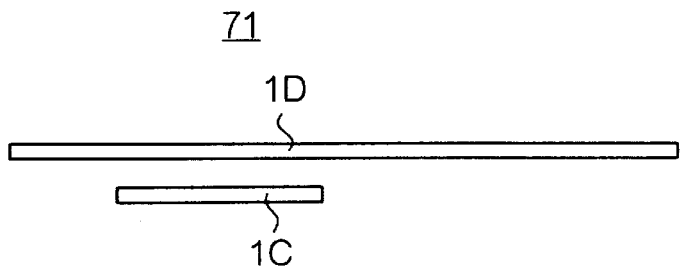
FIG. 16A is a plan view showing an inverted-L antenna according to a fifth embodiment.
Figure 16B:
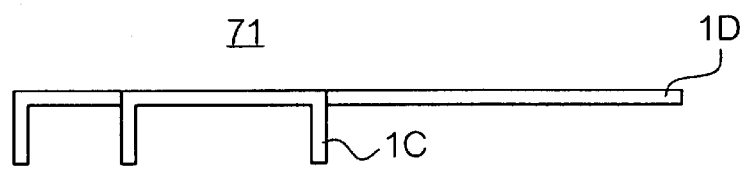
FIG. 16B is a front view showing the inverted-L antenna according to the fifth embodiment.

FIGS. 16A and 16B show a fifth embodiment of the present invention. In FIGS. 16A and 16B, the same or identical reference numerals as to those in FIGS. 11, 12, 13A or 13B are shown with the same reference numerals.

In the configuration shown in FIG. 16A, an inverted-L antenna 71 comprises an antenna element 1D composed of an L-shaped wire and a feeding line 1C composed of an approximately U-shaped wire.

The antenna element 1D and the feeding line 1C can easily be formed by, for example, bending wires such as urethane-coated copper wires.

As shown in FIGS. 16A and 16B, the feeding line 1C is arranged so that its longitudinal direction becomes parallel with the antenna element 1D, along by a side of the antenna element 1D.

Figure 17A:
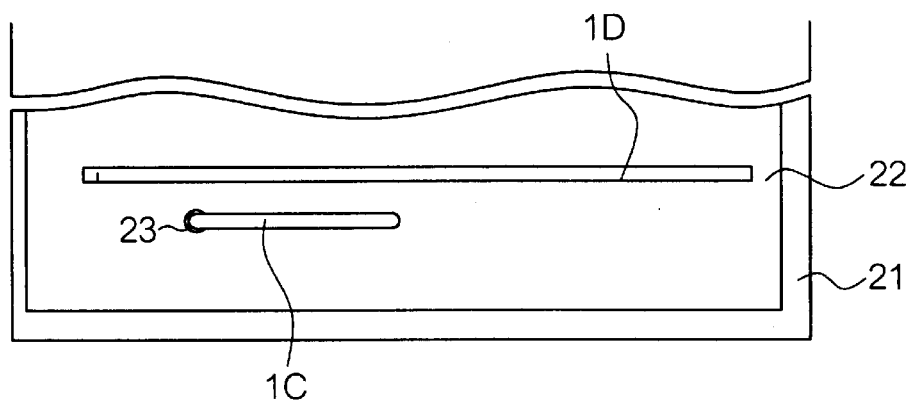
FIG. 17A is a plan view showing the mounted inverted-L antenna of the fifth embodiment.
Figure 17B:
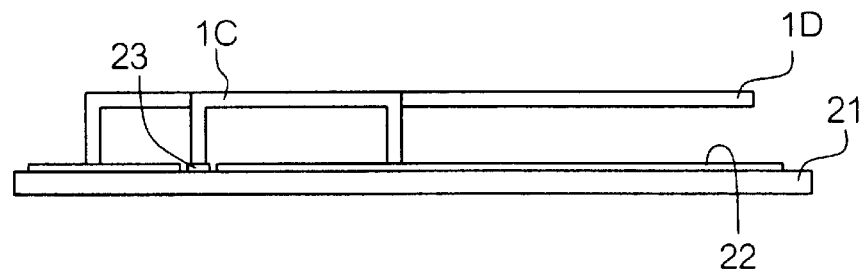
FIG. 17B is a front view showing the mounted inverted-L antenna of the fifth embodiment.

In addition, the feeding line 1C is arranged so that it keeps a proper electric coupling with the antenna element 1D. Practically, as shown in FIGS. 17A and 17B, one end of the feeding line 1C is electrically connected with the feeding point 23, while the other end is electrically connected with the ground pattern 22. This arrangement permits the impedance observed from the feeding point 23 to be set to a desired value (for example, 50 [Ω]) at a frequency to be used.

Figure 18:
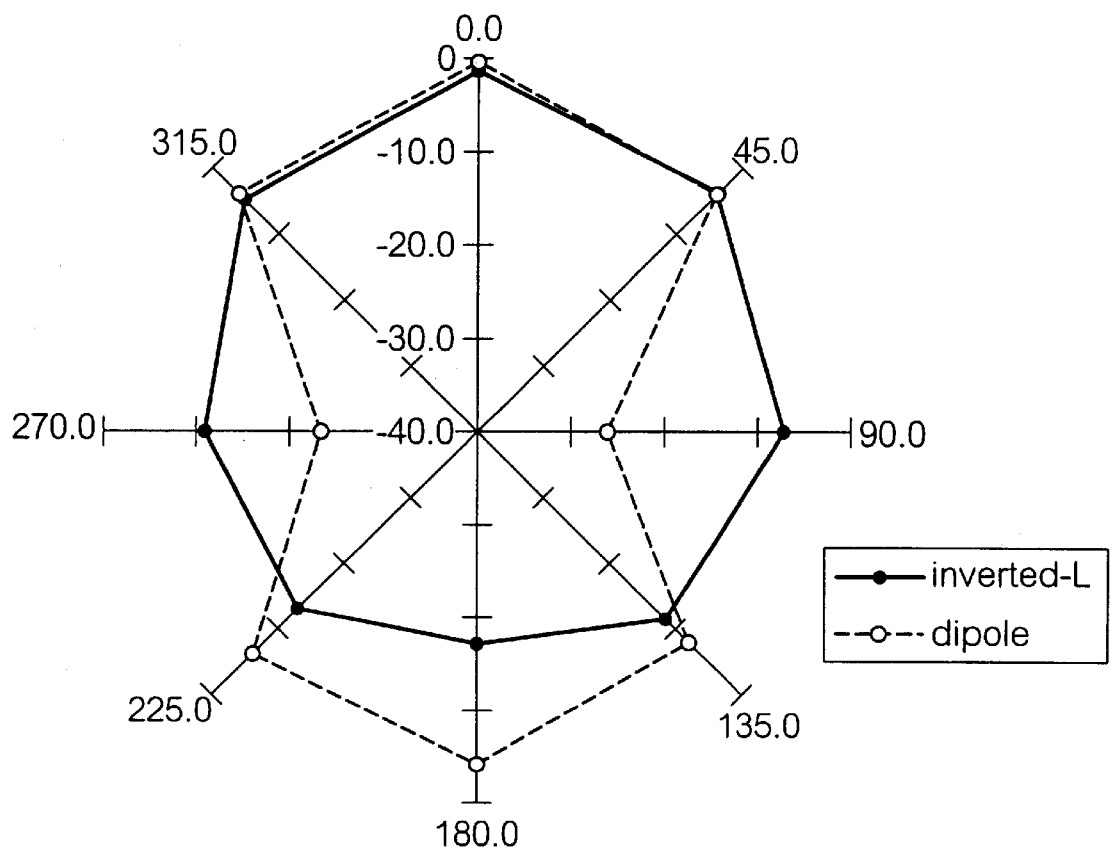
FIG. 18 illustrates an example of a characteristic of the inverted-L antenna.

An example of a radiation pattern of the inverted-L antenna 71 thus-constructed is shown in FIG. 18.

As shown in FIG. 18, although the gain in a directional range of 135 to 225 degrees may be worse than that of a dipole antenna, the gain in the remaining directional range is better than that of a dipole antenna.

Figure 19:
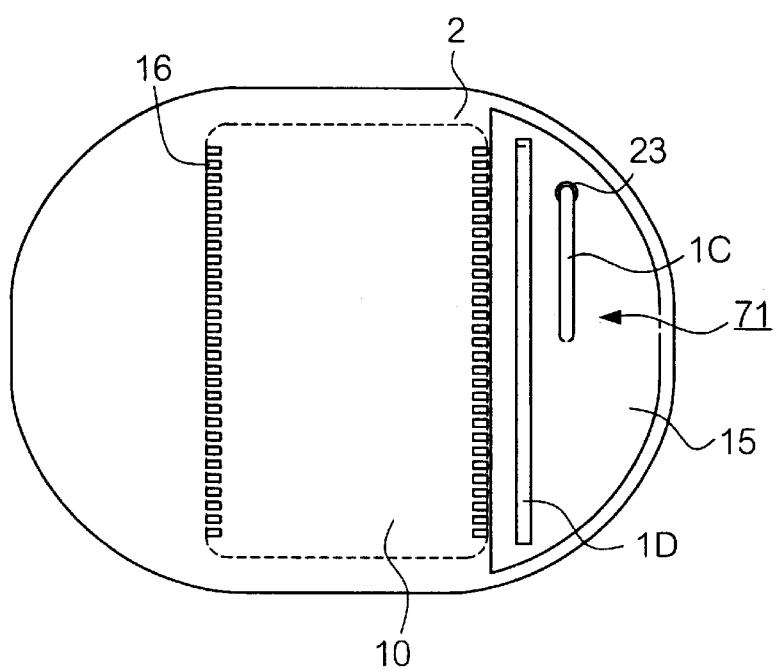
FIG. 19 illustrates a mounted state of the inverted-L antenna according to the fifth embodiment.

FIG. 19 shows an example of arranging the antenna on the substrate, when the antenna device described in the fifth embodiment is incorporated into a wristwatch-shaped radio apparatus.

The feeding line 1C is arranged in parallel with a side of the antenna element 1D of the inverted-L antenna 71, and one end of the feeding line 1C is electrically connected with the feeding point 23, whilst the other end is electrically connected to the ground pattern 15 which is mounted under the antenna element 1D.

In the case of FIG. 19, only a set of the antenna element 1D, feeding line 1C, and LCD drive electrodes 16 are depicted. It is preferable that the antenna element 1D be retained in parallel to the ground pattern 15 with the help of a plastic member or others.

[10] Sixth Embodiment

Figure 20:
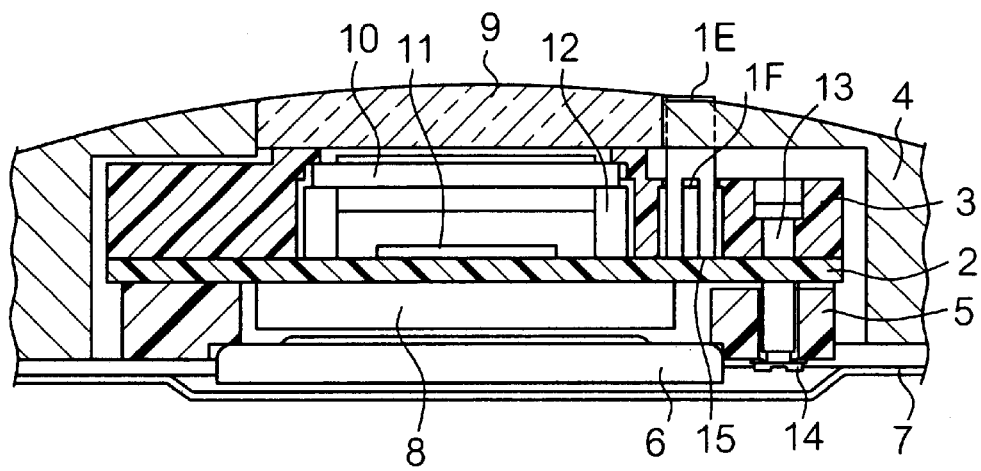
FIG. 20 is a sectional view showing a watch-shaped radio apparatus of a sixth embodiment.
Figure 21:
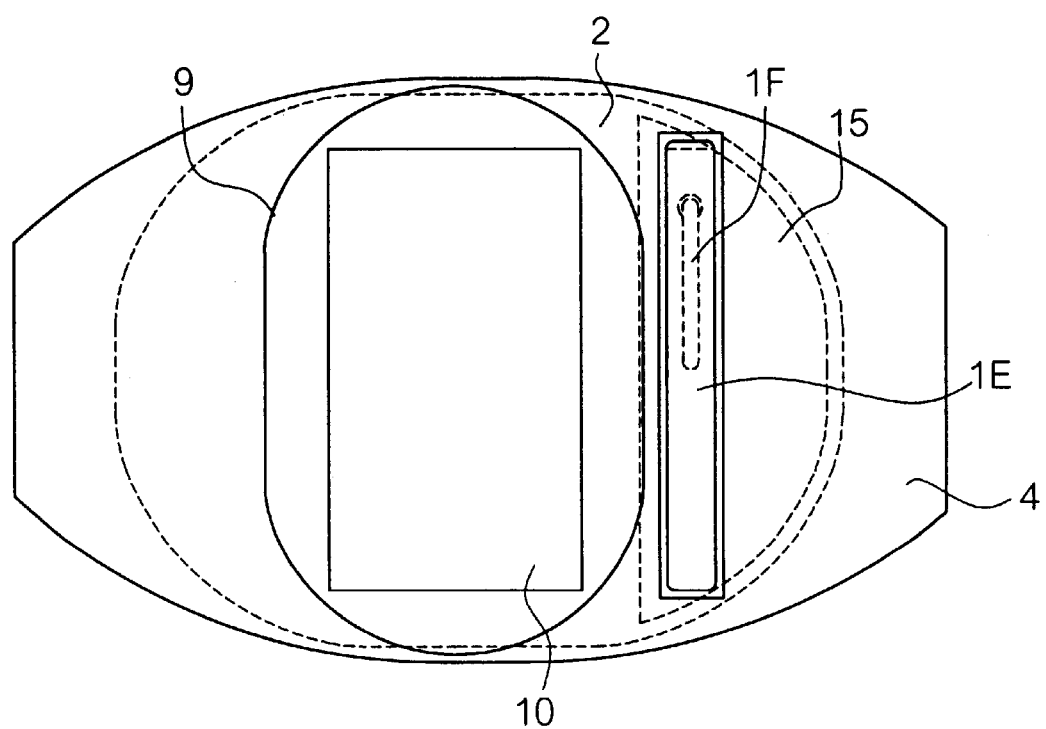
FIG. 21 is a schematic perspective view from the top of the watch-shaped radio apparatus according to the sixth embodiment.

FIG. 20 is a schematic sectional view showing a watch-shaped radio apparatus of a sixth embodiment, and FIG. 21 is a schematic perspective view from the top thereof.

The sixth embodiment concerns an arrangement of an inverted-L antenna, in which part of an antenna element 1E thereof, which is parallel with the ground pattern 15 on the circuit substrate 2, is placed on the upper surface of the case.

Figure 22A:
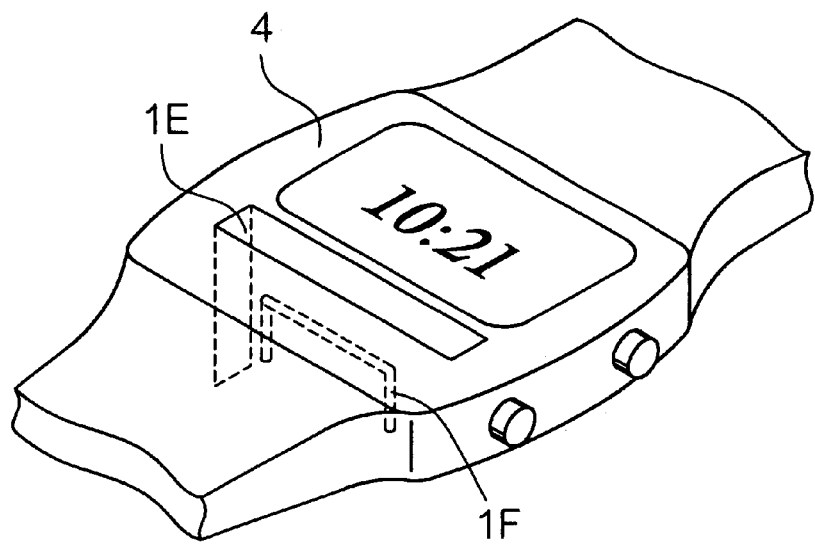
FIG. 22A is an outer oblique view (part 1) of a case on which an antenna element is secured.
Figure 22B:
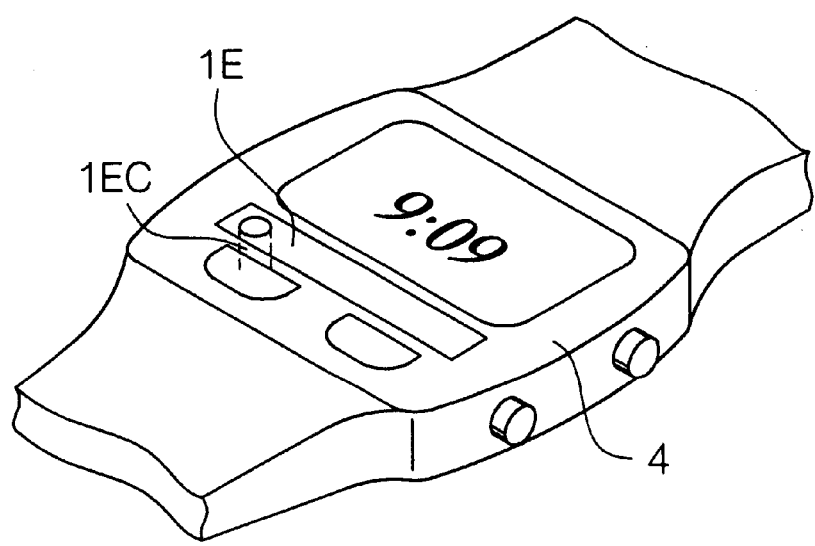
FIG. 22B is an outer oblique view (part 2) of a case on which an antenna element is secured.

Practically, one end of an L-shaped antenna element penetrates the case 4 to be connected to the ground pattern in the case. A feeding line 1F is placed under the antenna element 1E spaced apart therefrom. The feeding line 1F, which is parallel with the antenna element 1E, is placed non-contacted with the antenna element 1E. Thus, signals induced in the antenna element 1E are transmitted to each circuit on the circuit substrate 2 via the feeding line 1F. As shown in FIG. 22A, an antenna element 1E can be arranged to partly come out from the case 4 or can be made of a conductor electrode formed on the upper surface of the case 4 by means of, for example, vapor deposition. In the latter case, the antenna element 1E, which is the conductor electrode on the upper surface of the case, is connected to the ground pattern in the case through a conductor 1EC, as illustrated in FIG. 22B. If a metal plate is arranged on the upper surface of the case 4, a screw to fasten the metal plate may be made to penetrate the case 4 and connect with the ground pattern in the case 4.

In cases where the antenna device according to the present invention is embedded in a watch-shaped radio apparatus, an attention how to arrange the antenna has to be paid, because members surrounding the antenna may have a greater influence on its characteristics.

[11] Advantages of Third to Sixth Embodiments

Members which exert influence upon the characteristics of the antenna include the plastic member closed to the antenna, case, battery, and case back. To avoid these influence, it may be considered that the antenna be arranged as far from the substrate as possible. The antenna thus arranged is easier to optimize, because influences on the antenna, which arises from members surrounding the antenna, are lessened. Additionally, since there is also no member which covers the antenna, better sensitivity of the antenna can be easily obtained.

Alternatively, in cases where the antenna is placed outside the case, it should be considered that static electricity may be induced in the antenna. In general, static electricity induced by the human body is estimated to have about 10 [kV], in some cases, reaching 30 [kV].

Therefore, it is not preferable to place the antenna element, conductibly connecting to the circuit feeding point, and the feeding line outside the case as in the inverted-F antenna, because static electricity is easily attracted to the circuit.

In contrast, the antenna and feeding line structure of the third to sixth embodiments are constructed in consideration of these conditions. The antenna element is electrically connected to the ground pattern on the circuit substrate in a direct manner and electric charges flow outside the case through the ground pattern, while signals induced by the antenna element are sent to the circuit by way of the non-contact feeding line.

Accordingly, the third to sixth embodiments have the advantages described below.

(1) Compared to the inverted-F antenna, the inverted-L antenna is simple, thus making it easier to produce the antenna and lowering cost.

(2) Arranging the antenna outside the case makes it difficult to have influence from members surrounding the antenna and leads to an easy optimization.

(3) Arranging the antenna outside the case makes it difficult to have influence from members surrounding the antenna and leads to a higher possibility of improving the sensitivity of the antenna.

(4) Though the antenna is placed outside the case, the antenna element is connected to the ground and signals are transmitted by using the feeding line mounted with no contact to the antenna element. This prevents the circuit from being damaged due to the static electricity.

(5) Because the antenna element is placed outside the case, the inner space of the case can be saved, thus raising the degree of freedom for arranging the other parts, thus making the apparatus more compact.

(6) Where an antenna according to the present invention is practiced into a watch, the antenna is arranged outside the case. Therefore, influences on the antenna, which are caused from the user's body when a user wears the watch, can be lessened, increasing the sensitivity of the antenna.

[12] Modifications of Embodiments

[12.1] First Modification

Figure 23:
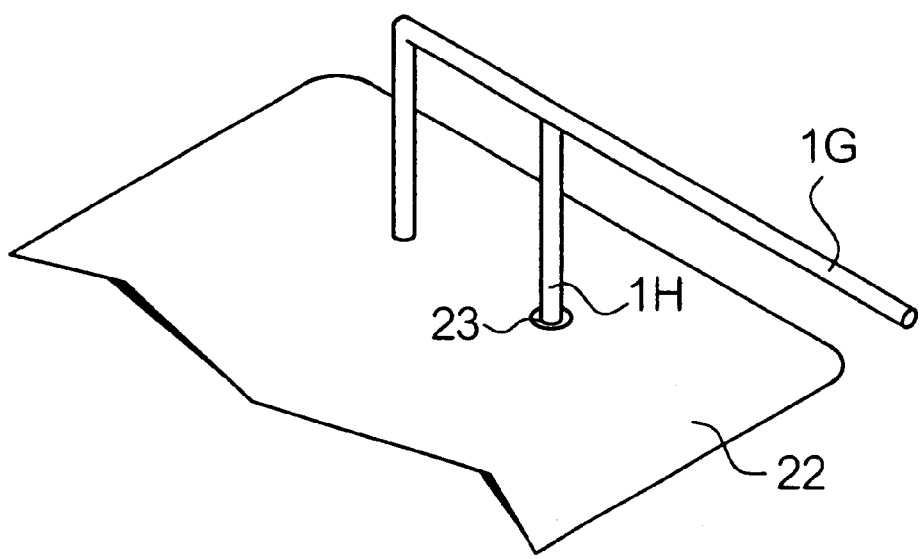
FIG. 23 illustrates a first modification of the embodiments.

In the foregoing first and second embodiments, the plate-like electrode is used as the antenna element. However, it is possible that, for example, as shown in FIG. 23, an antenna element 1G is made from a wire and conductibly connected to a feeding line 1H made from a wire as well.

[12.2] Second Modification

Figure 24A:
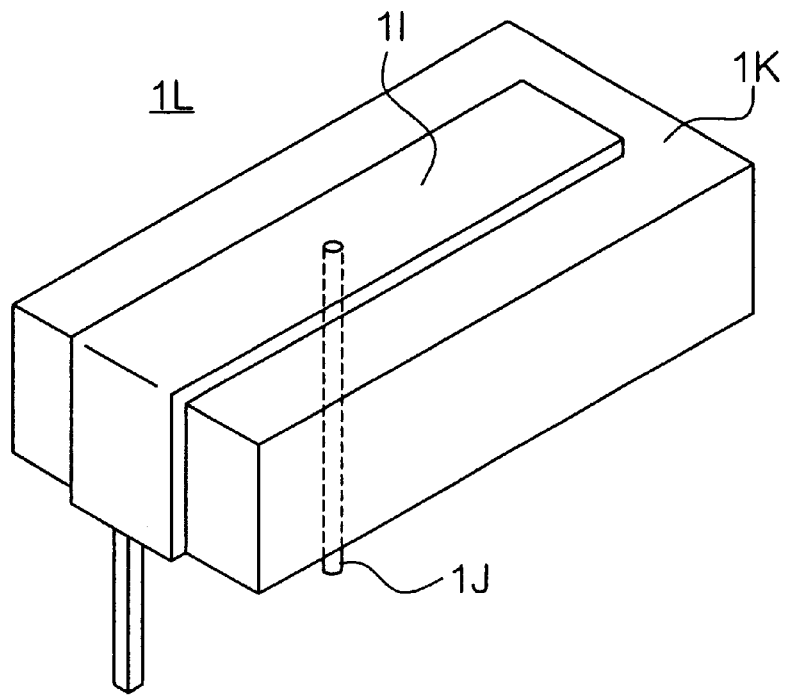
FIG. 24A is an outer oblique view (part 1) of an antenna unit according to a second modification.
Figure 24B:
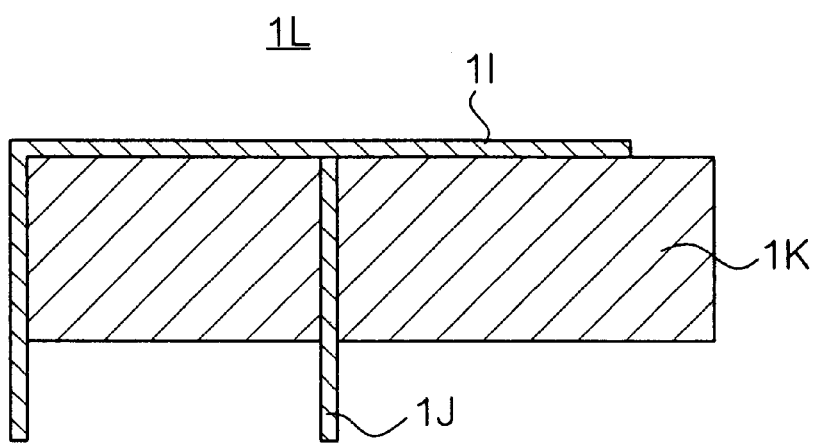
FIG. 24B is a sectional view (part 1) of the antenna unit according to the second modification.

In the foregoing embodiments, one end of the antenna element is formed into a free end. Instead, an antenna unit 1L shown in FIGS. 24A and 24B can be provided, in which an antenna element 1I is mounted on a retaining member 1K previously made from an appropriate dielectric material or others, and then a feeding line 1J is arranged. The feeding line 1J is made to penetrate the retaining member 1K, and then conductibly connected to the antenna element 1I.

This construction makes it easy to maintain a degree of parallel between the antenna element 1I and the ground pattern on a not-shown circuit substrate, avoiding the degradation of an antenna performance. Additionally, the antenna unit 1L can be handled with ease.

Furthermore, appropriately selecting a material of the retaining member 1K from a viewpoint of factors such as a dielectric constant leads to a more compact apparatus, with keeping the same resonant frequency to be used is the same.

Figure 25A:
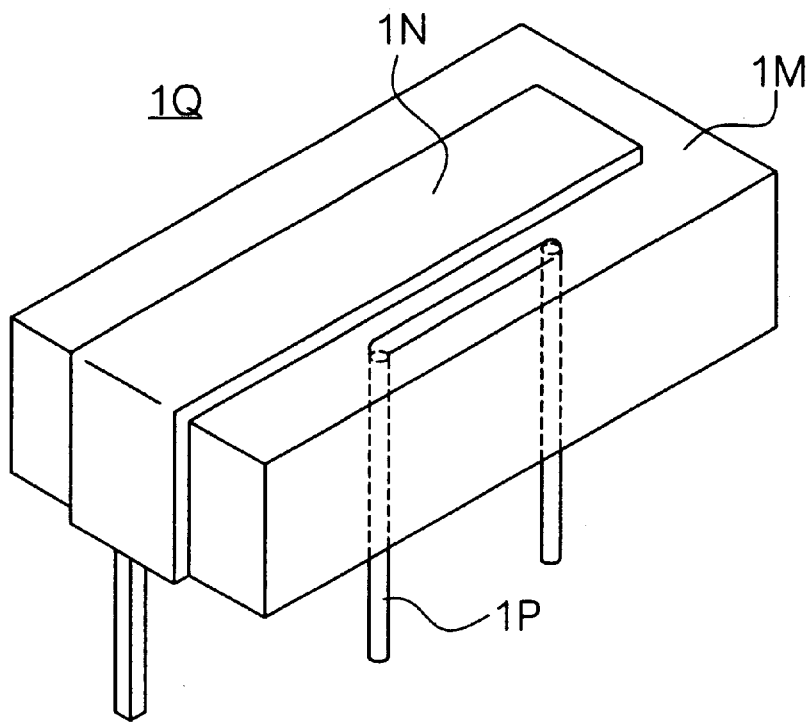
FIG. 25A is an outer oblique view (part 2) of the antenna unit according to the second modification.
Figure 25B:
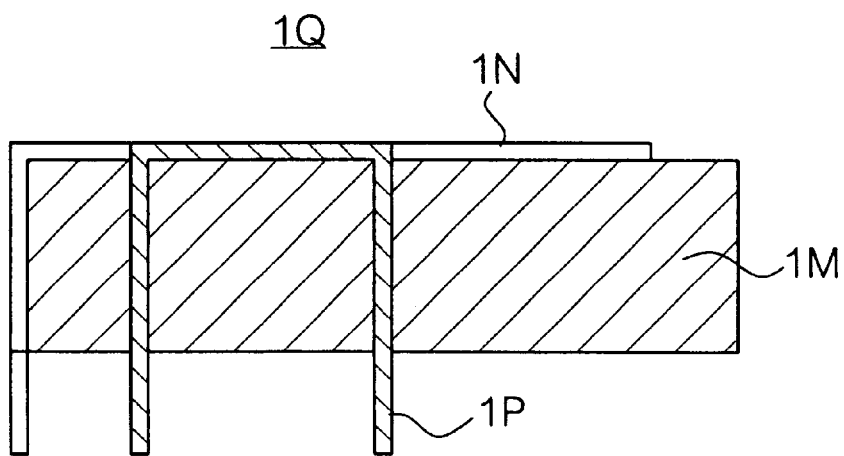
FIG. 25B is a sectional view (part 2) of the antenna unit according to the second modification.

Alternatively, another antenna unit 1Q shown in FIGS. 25A and 25B can be provided, in which an antenna element 1N is mounted on a retaining member 1M previously made from an appropriate dielectric material or others. In this antenna unit, a feeding line 1P is also arranged, in parallel with the antenna element 1N, spaced apart by a given distance from the antenna element 1N. Further, both ends of the feeding line 1P are made to penetrate the retaining member 1M to complete the antenna unit 1Q.

This construction makes it easy to maintain a degree of parallel between the antenna element 1N and the ground pattern on a not-shown circuit substrate, avoiding the degradation of an antenna performance. Additionally, the antenna unit 1L can be handled with ease.

What is claimed is:

1. A high-frequency radio apparatus, comprising:
    an antenna device for the high-frequency radio apparatus comprising:
        a circuit substrate;
        a ground pattern on the circuit substrate;
        a feeding point on the circuit substrate;
        a metal, L-shaped antenna element, one end of which is connected to the ground pattern, the metal, L-shaped antenna element being located above the ground pattern; and
        a feeding line, one end of which is connected to the feeding point and the other end of which is connected to the antenna element;
        wherein both the ground pattern and the feeding point are on the same plane which is a plane defining a surface of the circuit substrate;

a plurality of electrical circuits mounted on the circuit substrate; and a display device for displaying information, the display device being positioned one side of the circuit substrate;

wherein the antenna device is positioned on the same side of the circuit substrate as the display device.

2. The high-frequency radio apparatus of claim 1, further comprising:

a case comprising:

a case body containing the antenna device, the display device, and the circuit substrate; and a case back made of conductive material; and a battery having a plurality of electrodes for supplying power to drive the high-frequency radio apparatus;

wherein the case back is electrically connected to either a ground pattern of the circuit substrate or an electrode of the battery.

3. A high-frequency radio apparatus, comprising:

an antenna device for a high-frequency radio apparatus comprising:

a multi-layer circuit substrate;

a ground pattern on one layer of the multi-layer circuit substrate;

a feeding point on a top layer of the multi-layer circuit substrate;

a metal, L-shaped antenna element, one end of which is connected to the ground pattern; and a feeding line, one end of which is connected to the feeding point and the other end of which is connected to the antenna element;

wherein both the ground pattern and the feeding point are on the same plane which is a plane defining a surface of the circuit substrate;

a plurality of electrical circuits mounted on the circuit substrate; and a display device for displaying in information, the display device being positioned on one side of the circuit substrate;

wherein the antenna device is positioned on the same side of the circuit substrate as the display device.

4. The high-frequency radio apparatus of claim 3, further comprising:

a case comprising:

a case body containing the antenna device, the display device; and the circuit substrate; and a case back, made of conductive material; and a battery for supplying power to drive the high-frequency radio apparatus;

wherein the case back is electrically connected to either the ground pattern of the circuit substrate or an electrode of the battery.

5. An antenna device for a high-frequency radio apparatus, comprising:

a circuit substrate with a ground pattern and a feeding point;

a metal, L-shaped antenna element, one end of which is connected to the ground pattern, the metal, L-shaped antenna element being located above the ground pattern; and a feeding line, one end of which is connected to the feeding point and the other end of which is connected to the ground pattern;

wherein both the ground pattern and the feeding point are on the same plane which is a plane defining a surface of the circuit substrate.

6. The antenna device of claim 5, wherein the circuit substrate has a plurality of layers, the feeding point and the ground pattern are formed on at least one layer of the plurality of layers, and the ground pattern covers approximately the entire surface of the layer on which the ground pattern is formed.

7. The antenna device of claim 5, wherein the ground pattern comprises an electrode pattern formed on a surface of the circuit substrate.

8. The antenna device of claim 7, wherein the ground pattern is formed over approximately the entire surface of the circuit substrate and is positioned under the antenna element.

9. The antenna device of claim 5, wherein a length of the antenna element is one fourth of the wavelength of the frequency to be used.

10. A high-frequency radio apparatus, comprising:

a wristwatch-shaped case;

an antenna device for a high-frequency radio apparatus comprising:

a circuit substrate with a ground pattern and a feeding point;

a metal, L-shaped antenna element, one end of which is connected to the ground pattern, the metal, L-shaped antenna element being located above the ground pattern; and a feeding line, one end of which is connected to the feeding point and the other end of which is connected to the ground pattern;

wherein both the ground pattern and the feeding point are on the same plane which is a plane defining a surface of the circuit substrate;

a plurality of electrical circuits mounted on the circuit substrate; and a display device for displaying information, the display device being positioned on one side of the circuit substrate;

wherein the antenna device is positioned on the same side of the circuit substrate as the display device and is in the wristwatch-shaped case.

11. The high-frequency radio apparatus of claim 10, wherein the circuit substrate has a plurality of layers, the feeding point and the ground pattern are formed on at least one layer of the plurality of layers, and the ground pattern covers approximately the entire surface of the layer on which the ground pattern is formed.

12. An antenna device for a high-frequency radio apparatus, comprising:

a circuit substrate having a ground pattern and a feeding point;

a metal, L-shaped antenna element, one end of which is connected to the ground pattern, the metal, L-shaped antenna element being located above the ground pattern; and a feeding line, one end of which is connected to the ground pattern and the other end of which is connected to the feeding point;

wherein both the ground pattern and the feeding point are on the same plane which is a plane defining a surface of the circuit substrate.

13. The antenna device of claim 12, wherein the antenna element is made of a metal material and connected to the ground pattern via a conductive member made of the same material as the antenna element, the antenna element and the conductive member being integrally formed into an L-shape.

14. A watch-shaped radio apparatus, comprising:

a wristwatch-shaped case; and an antenna device for a high-frequency radio apparatus, comprising:

a circuit substrate having a ground pattern, a feeding point, and a radio circuit on the circuit substrate;

an antenna element, one end of which is electrically connected to the ground pattern and is in contact with an upper surface of the case, the antenna element being located above the ground pattern; and a feeding line, one end of which is connected to the ground pattern and the other end of which is connected to the feeding point;

wherein both the ground pattern and the feeding point are on the same plane which is a plane defining a surface of the circuit substrate;

wherein the wristwatch-shaped case contains the antenna device.

* * * * *